(12) United States Patent  (10) Patent No.: US 8,875,856 B2
Fiorentin et al.  (45) Date of Patent: *Nov. 4, 2014

(54) TILE FOR FORMING A GROUND POWER SUPPLY LINE

(71) Applicant: Fiat Group Automobiles S.p.A, Turin (IT)

(72) Inventors: Stefano Re Fiorentin, Turin (IT); Giancarlo Casellato, Turin (IT)

(73) Assignee: Fiat Group Automobiles S.p.A., Turin (IT)

( * ) Notice: Subject to any disclaimer, the term of this patent is extended or adjusted under 35 U.S.C. 154(b) by 0 days.

This patent is subject to a terminal disclaimer.

(21) Appl. No.: 13/652,707

(22) Filed: Oct. 16, 2012

(65) Prior Publication Data

US 2013/0037366 A1  Feb. 14, 2013

Related U.S. Application Data

(62) Division of application No. 12/828,745, filed on Jul. 1, 2010, now Pat. No. 8,365,888.

(30) Foreign Application Priority Data

Jul. 6, 2009 (EP) .................................... 09425264

(51) Int. Cl.
*B60M 1/36* (2006.01)
*B60M 1/10* (2006.01)
*B60L 11/18* (2006.01)
*B60L 5/42* (2006.01)

(52) U.S. Cl.
CPC ............... *B60M 1/36* (2013.01); *Y02T 10/7088* (2013.01); *Y02T 10/7005* (2013.01); *B60M 1/10* (2013.01); *Y02T 90/121* (2013.01); *B60L 11/1816* (2013.01); *Y02T 90/14* (2013.01); *B60L 5/42* (2013.01)
USPC .......................... 191/13; 191/22 R; 191/22 C

(58) Field of Classification Search
USPC .......... 191/6, 8, 13, 14–21, 22 C, 22 R, 23 R, 191/45 R, 56
See application file for complete search history.

(56) References Cited

U.S. PATENT DOCUMENTS 2,691,946 A  10/1954  Marmo
4,139,071 A  2/1979  Tackett
(Continued)

FOREIGN PATENT DOCUMENTS

| | | |
|---|---|---|
| DE | 31 20 648 A1 | 12/1982 |
| DE | 43 29 935 A1 | 3/1995 |
| JP | 2005-168233 A | 6/2005 |
| WO | 93/10995 A | 6/1993 |
| WO | 99/00266 A | 1/1999 |

OTHER PUBLICATIONS

European Search Report issued in a prior European Patent Application No. EP 09425264.0 on Dec. 11, 2009.

*Primary Examiner* — Zachary Kuhfuss
(74) *Attorney, Agent, or Firm* — Gottlieb, Rackman & Reisman, P.C.

(57) ABSTRACT

A ground power supply line for electric traction vehicles is provided with two conductors carried by a series of tiles aligned to one another; each tile has a conductive plate and a lower supporting structure, which is made of insulating material and accommodates electric connectors, normally open switches, and a control and command unit, which switches the switches for selectively electrically connecting the conductive plate to the conductors in response to a signal deriving from an electric traction vehicle passing over said external conductive plate; the upper surface of the conductive plates is flushed with the remaining part of a road surface.

18 Claims, 4 Drawing Sheets

(56) References Cited

U.S. PATENT DOCUMENTS

| | | |
|---|---|---|
| 4,476,947 A | 10/1984 | Rynbrandt |
| 4,836,344 A | 6/1989 | Bolger |
| 5,277,285 A | 1/1994 | Musachio |
| 6,230,861 B1 | 5/2001 | Cornic |
| 6,382,378 B1 | 5/2002 | Cornic |
| 6,427,816 B1 | 8/2002 | Siciliano et al. |
| 8,365,888 B2 * | 2/2013 | Re Fiorentin et al. .......... 191/13 |

* cited by examiner

TILE FOR FORMING A GROUND POWER SUPPLY LINE

RELATED APPLICATIONS

This application is a divisional of U.S. Ser. No. 12/828,745 filed Jul. 1, 2010, which claim priority to the European Patent Application No. 09425264.0 filed Jul. 6, 2009, all incorporated herein by reference.

BACKGROUND OF THE INVENTION

Field of the Invention

The present invention relates to a tile for forming a ground power supply line, which allows electric traction vehicles to pick up electric current.

Electric vehicles have always been of high interest in the field of low environmental impact mobility. The poor diffusion of these vehicles is substantially due to two factors: their limited autonomy (maximum values in the range between 100 and 200 km); and the battery recharging time (typically in the range from a few dozens of minutes to several hours).

Furthermore, the batteries have relatively large volumes and heavy weights and provide a much lower energy density than the current automotive chemical fuels.

In order to solve these drawbacks, it has been suggested to create an appropriate, fixed infrastructure capable of supplying electricity, which is picked up by the vehicle by means of appropriate conductive elements pressed against the ground. Thereby, the batteries are exclusively used on road stretches free from such an infrastructure. Vehicle autonomy becomes substantially unlimited, and the battery recharging times are null (because the batteries are recharged while travelling).

Obviously, when including a ground surface infrastructure is desired, instead of an overhead infrastructure (such as trolley bus power supply lines), the risks of electrocution of people who may occasionally come in contact with the ground infrastructure must be avoided.

In order to solve such a problem, ground power supply lines comprise a series of conductive segments, which are aligned along the vehicle route and are electrically isolated from one another: upon the vehicle passing, only one of the segments which is underneath the vehicle is live, in response to a command emitted by the vehicle itself, to pick up the electric current.

U.S. Pat. No. 6,230,861 describes an electric traction vehicle provided with two longitudinally aligned brushes, one for picking up the live electricity and the other for closing the electric circuit. The conductive segments are associated with respective switching circuits, controlled by the vehicle to connect each segment to a live line and to a ground line, when either the aforesaid brushes come in contact with such a segment.

The switching circuits, the live line and the ground line are buried, whereby this solutions requires long implementation times and high costs, in particular for excavating.

Moreover, the road lane where the electric power line is installed is reserved only to electric vehicles intended to pick up the electric current, i.e. it may not be used by all motor vehicles circulating on the road, especially because the conductive segments are carried by an insulating frame which protrudes from the top of the road surface.

At the same time, the wear caused by the sliding contact between the brushes and the conductive segments is relatively high, whereby the brushes need to be frequently replaced.

SUMMARY OF THE INVENTION

It is the object of the present invention to provide an electrified road surface, which allows to simply and cost-effectively solve the aforementioned problems.

According to the present invention, a tile for forming a ground power supply line is provided as claimed in the attached claims.

BRIEF DESCRIPTION OF THE DRAWINGS

The invention will now be described with reference to the accompanying drawings which illustrate a non-limitative embodiment thereof, in which.

DETAILED DESCRIPTION OF THE INVENTION

Figure 1:
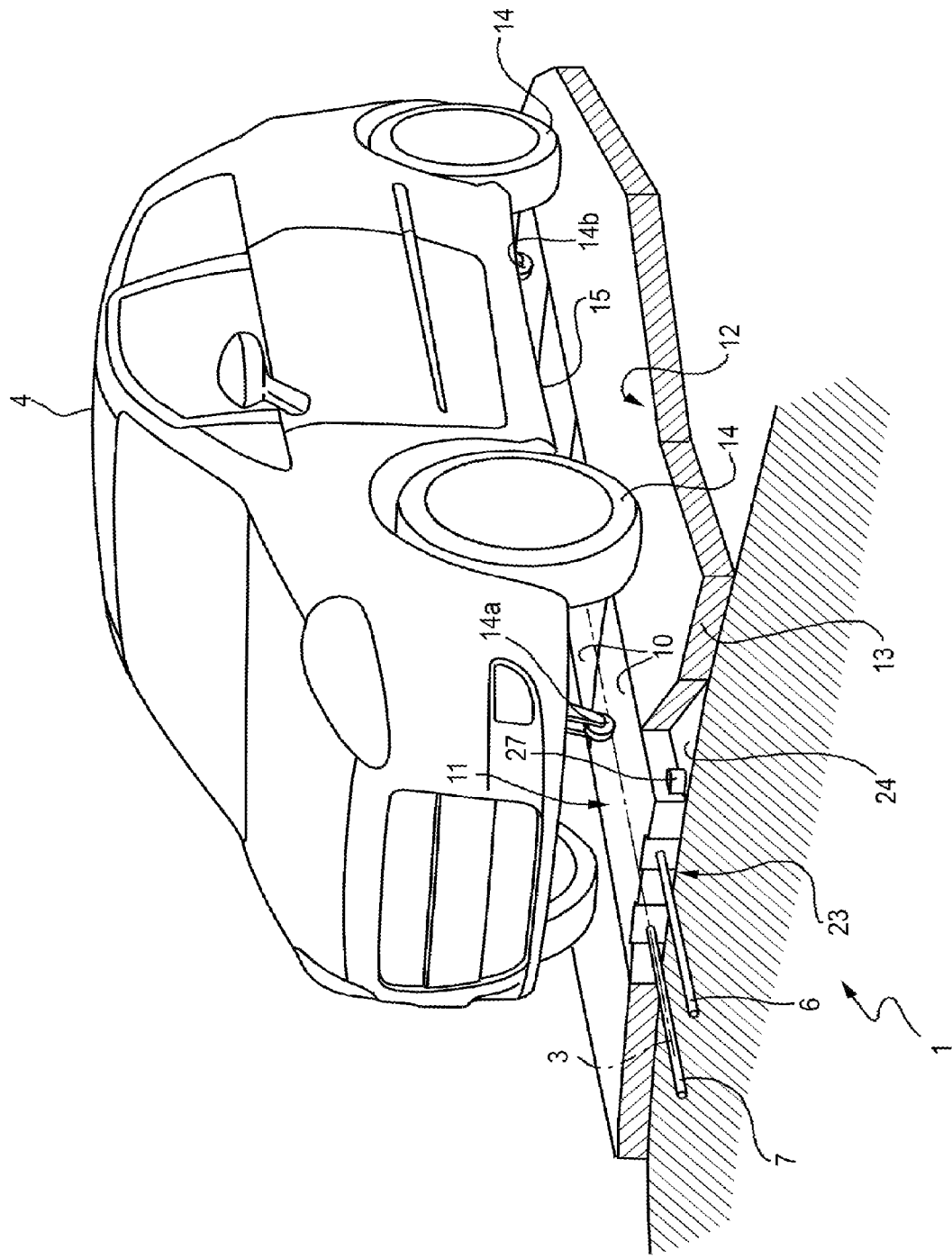
FIG. 1 is a perspective view of a preferred embodiment of the tile for forming a ground power supply line according to the present invention.

In FIG. 1, numeral 1 indicates as a whole a ground power supply line, which extends along a longitudinal direction 3, coinciding with a route or a road lane on which an electric traction vehicle 4 may travel.

Figure 4:
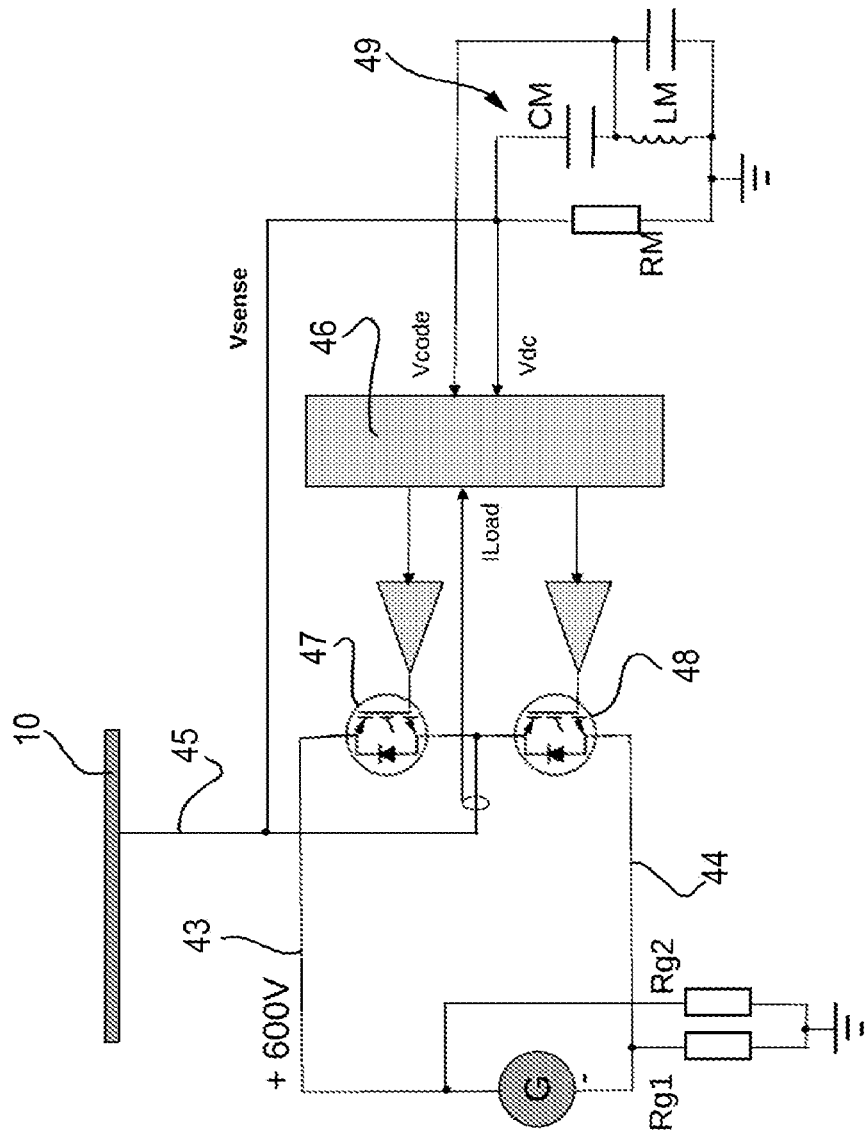
FIG. 4 is a diagram of an electric circuit belonging to the tile in FIG. 1.

Line 1 comprises a live conductor 6 and a ground conductor 7, which are parallel, are isolated from each other and are connected to the terminals of an electric power generator G (FIG. 4) arranged upstream of line 1 (and possibly defined by a connection box or an energy distribution station). Generator G is substantially isolated from ground; FIG. 4 shows two (high value) resistors Rg1 and Rg2, the purpose of which is only to avoid electrostatic potentials, and may also not be real (the normal losses of the energy distribution system may suffice).

Line 1 further comprises a series of conductive segments, which are defined by respective plates 10 aligned to one another along the direction 3, are electrically isolated from one another, and are also electrically isolated from the conductors 6 and 7 in rest condition, i.e. when no authorized electric vehicle needs to be powered.

The upper surface 11 of the plates 10 is flushed with the remaining part 12 of the road surface, on which the tires 14 of the vehicles roll. Such a part 12 is defined by the surface of a road paving 13, e.g. asphalt.

Therefore, any tired vehicle may travel without danger of electrocution, and substantially without steps between road paving 13 and line 1, on the road lane defined by the surfaces 11 and 12 together.

Vehicle 4 is provided with two electric energy captors 14a,14b (diagrammatically illustrated) arranged at a distance greater than the length of each plate 10 and, with respect to the surface 12, at a height such as to come in contact with two different plates 10. The captors 14a,14b are preferably of the rolling type, i.e. are defined by wheels or rollers, and are arranged under the platform 15 of the vehicle 4. Alternatively, these captors are defined by the tires 14 of vehicle 4, e.g. such as the tires described in patent IT1030679. Surface 11 is preferably either corrugated or embossed so as to reproduce the features of the normal asphalted road paving.

When the two captors 14a,14b roll on respective plates 10, these plates 10 are automatically connected to the conductors 6 and 7, respectively, as best described below, to allow the vehicle 4 to pick up electric current from the generator G. In a known manner not described in detail, the electric current will supply an electric driving motor and recharge the batteries of accumulators (not shown) on the vehicle 4.

As the captors 14a,14b roll along the direction 3 on new plates 10, those which are left go back to their rest condition (i.e. go back to being electrically isolated from the conductors 6 and 7), while the new plates 10 which come in contact with the captors 14a,14b are activated, i.e. connected to the conductors 6 and 7.

Thereby, the electric power transmitted by the generator G is substantially isolated from ground, thus avoiding the onset of undesired currents, and ensuring the safety of line 1, because simply touching any of the deactivated plates 10 is not dangerous. Indeed, in order to close the circuit, a person would need to touch the activated plates 10, which are however arranged underneath the vehicle 4 and therefore may not be reached.

Figure 2:
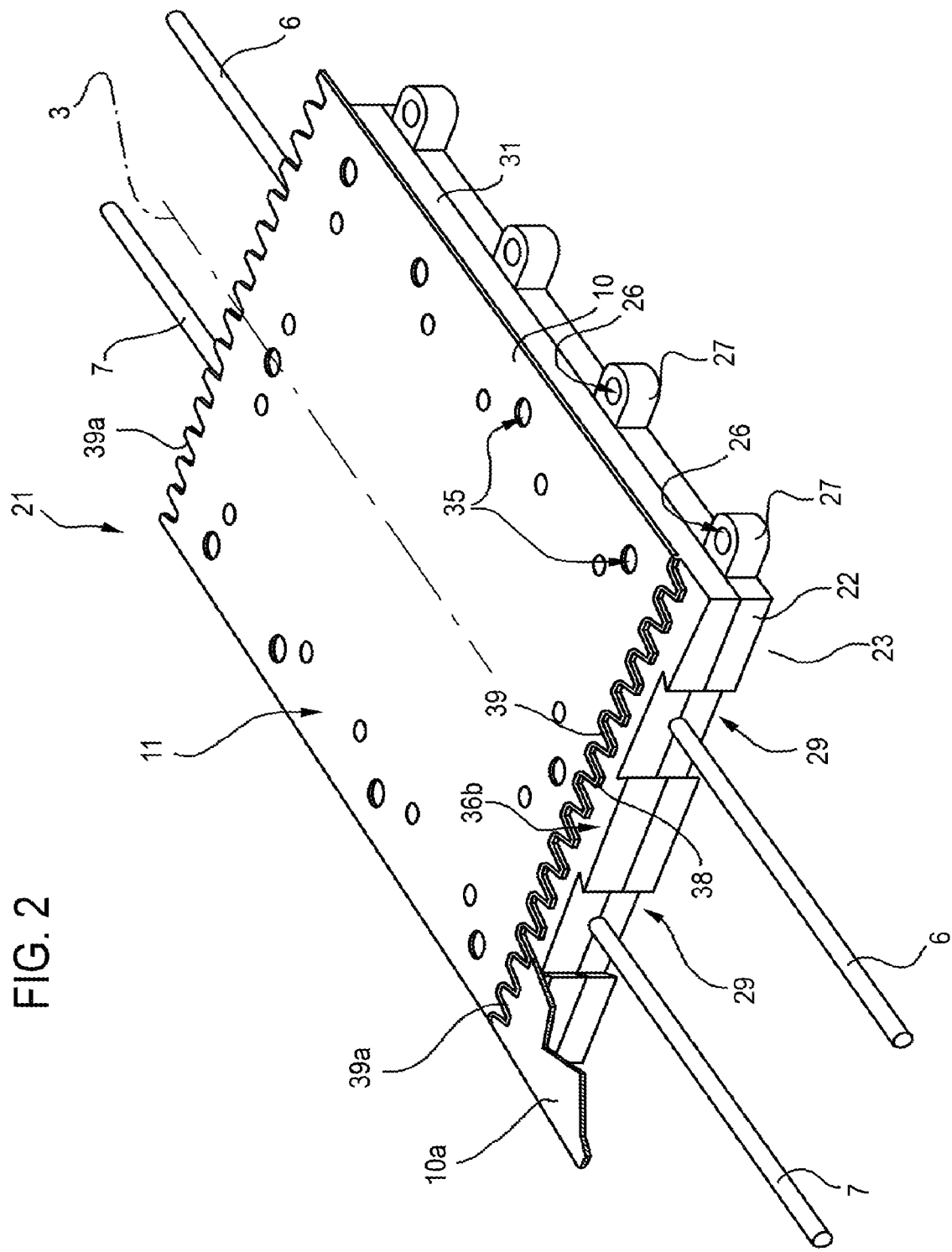
FIG. 2 shows the tile in FIG. 1 on enlarged scale and according to a different perspective.
Figure 3:
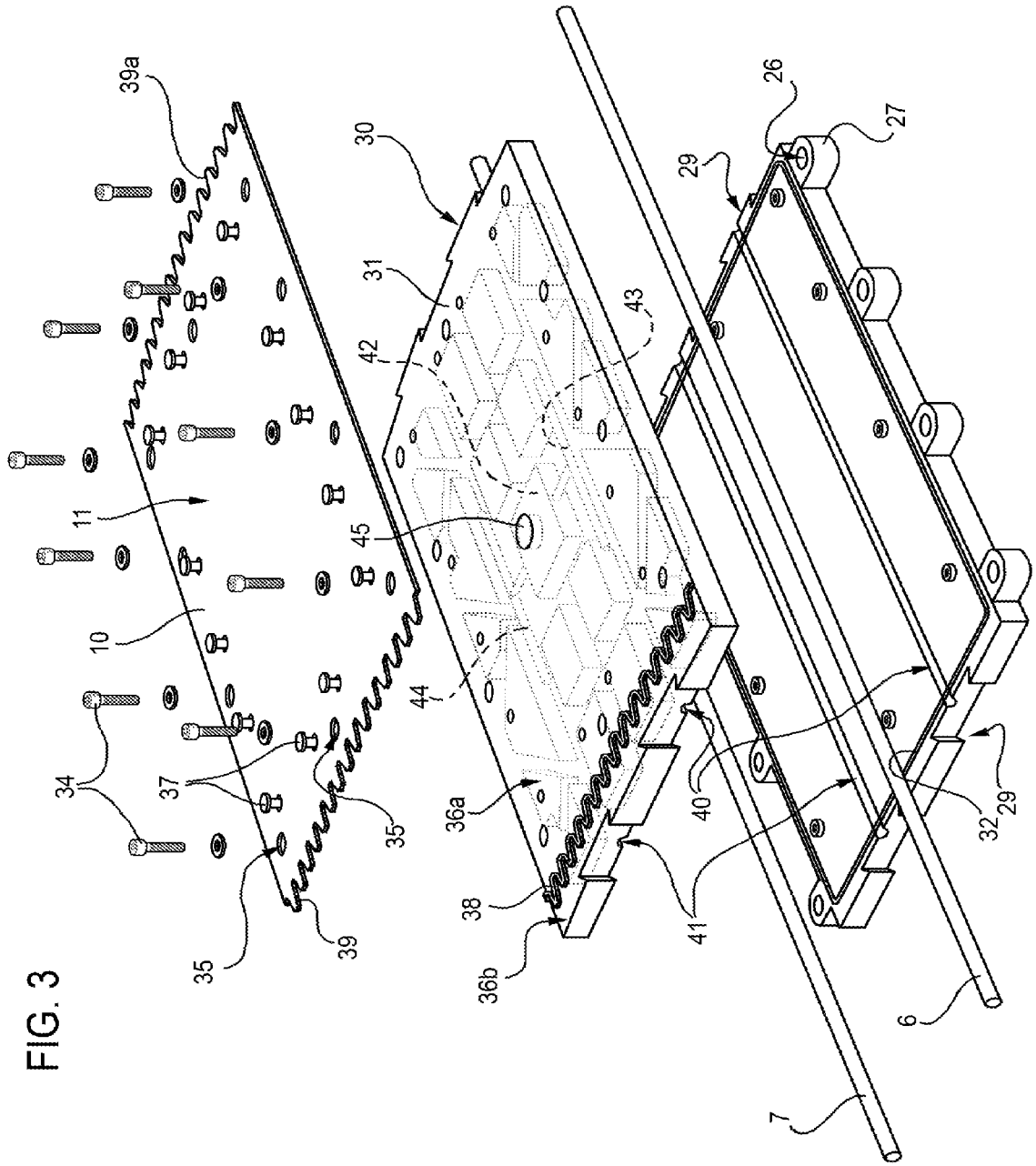
FIG. 3 shows an exploded view of the tile in FIG. 1.

As shown in FIGS. 2 and 3, line 1 consists of a plurality of reciprocally equal tiles 21, each of which comprises a corresponding plate 10 arranged at the top in a fixed position.

Tile 21 comprises a base 22, which is made of electrically insulating material, e.g. a thermoplastic material, is substantially rectangular in plan, has a substantially flat, horizontal lower face 23 resting on the road surface base, in particular on a cement plinth 24 (FIG. 1), and is fixed to the plinth 24 by means of connection devices (not shown), defined for example by plugs, which engage respective holes 26 made in side fins 27 of the base 22.

The base 22 of each tile 21 is connected to the bases 22 of both the previous tile and the next tile in a relative horizontally fixed position, e.g. by means of dovetail joints or couplings 29, while it may be inserted or removed in the vertical direction.

Tile 21 then comprises an element 30 overlapping the base 22 and comprising a block 31 made of electrically insulating material, e.g. a thermoplastic material. The block 31 is substantially rectangular in plan, has the same length and width as the base 22 externally, and is also provided with couplings 29 to be connected to the blocks 31 of the adjacent tiles 21.

Block 31 is overlapping the base 22 and is coupled to the base 22 by interposing seals 32, arranged along the whole periphery of the tile 21. Block 31 and base 22 are fixed to each other, preferably by means of vertical screws 34 which are arranged along the periphery of the tile 21 and are accessible through respective holes 35 made in the plate 10. The fins 27, the vertical sides of base 22 and block 31 then remain embedded in the road paving 13.

Plate 10 rests on an upper surface 36a of the block 31 and is fixed to the block 31, in particular by means of rivets 37. A ridge 38 separates the surface 36a from an area 36b, which defines a longitudinal end of the block 31 at the top and is aligned with the surface 36a.

Ridge 38 defines a reference and a shoulder for positioning an edge 39 of the plate 10 and an edge 39a of an adjacent plate 10a (partially shown in FIG. 2) along the direction 3.

Plate 10 rests on the surface 36a and overhangingly protrudes along the direction 3 with respect to the element 30, on the opposite side with respect to the area 36b; and the plate 10a has one end resting on the area 36b.

The edges 39 and 39a of the plates has a profile which is complementary to that of ridge 38. The plates 10 have a longitudinal dimension such as to remain in contact against the ridges 38 on both sides. Each ridge 38 thus defines the distance between two subsequent plates 10,10a and keeps them electrically isolated. However, each of the two rolling captors 14a,14b, once the end of a plate 10 has been reached while rolling, comes in contact with the subsequent plate 10a at the same time, even if the latter is isolated from the previous one by means of ridge 38. Indeed, the plan profile of the ridge 38 is undulated, whereby the edges 39 and 39a form respective teeth which mesh with one another, and the longitudinal dimension of the ridge 38 is relatively small, as compared to the dimensions of the contact area between the rolling captor and the surface 11. A passage of electric current is generated between the two adjacent tiles 21 by virtue of the simultaneous contact of the rolling captor on the plates 10 and 10a: such an electric current defines a signal which causes the instantaneous activation of the next plate 10a, so as to also put the next plate 10a at the same potential as the previous plate 10.

With reference to FIG. 3, base 22 and block 31 define two channels 40,41 therebetween, which are parallel to the direction 3, accommodate respective portions of conductors 6 and 7, and are transversally spaced so as to keep the conductors 6 and 7 electrically isolated.

Element 30 further comprises: a switching unit 42; connectors 43,44 (FIG. 4), which connect the unit 42 to the portions of the conductors 6,7, respectively; and a connector 45 which extends from the unit 42 to the surface 36a, so as to come in contact with the plate 10. Unit 42 and connectors 43-45 are either embedded or enclosed in the block 31, so as to leave free only the ends of the connectors 43,44 which come in contact with the conductors 6,7, respectively, at the channels 40,41, and the end of the connector 45 which comes in contact with the plate 10 at the surface 36a.

FIG. 4 diagrammatically shows the components of the unit 42. Unit 42 comprises a control and command unit 46, and two switches 47,48 (defined in particular by IGBT), which are arranged in parallel, are connected to the plate 10 by means of connector 45 and are both normally open: when switched by corresponding commands of unit 46, the switch 47 closes the circuit between the connectors 43 and 45, or the switch 48 closes the circuit between the connectors 44 and 45.

The unit 46 is connected to the plate 10 by means of a shunt line (Vsense) connected to the connector 45, is capable of detecting the contact of a captor 14a,14b with the plate 10, and recognizes whether the vehicle 4 is enabled to pick up electricity. In particular, by means of the captors 14a,14b arranged underneath the platform 15, the vehicle 4 supplies a recognition code, in the form of an alternating electric signal (Vcode) having an appropriately modulated high-frequency, which is acquired by the unit 42 by means of a filter 49, tuned to the transmission frequency, and is therefore subjected to verification by the unit 46. If the result of the verification is affirmative, the unit 46 controls the closing of one of the two switches 47,48 to activate the supply of electricity to the vehicle 4.

Vehicle 4 also supplies a polarity signal, in the form of low-current intensity, direct voltage (Vdc) which is acquired by the unit 46 when the vehicle 4 comes in contact with the line 1 at the beginning of the route and serves to indicate the initial polarity of the voltage required by the captor 14a to the plate 10 (and thus to indicate which of the two switches 47,48 must be activated).

In other words, unit 46 represents the control electronics and is in charge of the following functions:
  demodulating the alternating electric signal and decoding the associated code;
  detecting the polarity signal when a vehicle 4 enters the line 1;

managing intervention times (maximum activation times); unit 46 deactivates the switches 47,48 when the signal carrying the recognition code ends or after a maximum time, for safety reasons;

possibly communicating with the adjacent tiles for diagnostic purposes and/or for improving the management of line 1;

controlling the presence of possible short-circuits or faults on line 1, acting accordingly to prevent damages to the circuit.

As shown in FIG. 1, line 1 is installed when the road surface is made. In particular, the bases 22 are rested and fixed one after the other on the plinth 24, and are coupled to one another in a row. Once the conductors 6 and 7 have been laid on the bases 22, the elements 30 with the plates 10 are overlapped on the respective bases 22 to form the various tiles 21. Finally, for each tile 21, the element 30 is fixed to the corresponding base 22.

Finally, the road paving 13 is cast on the remaining part of the plinth 24, so as to embed the sides of the tiles 21 and make the surfaces 11 and 12 flush.

From the above, it is apparent that line 1 is relatively simple and cost-effective, because of the switching circuits, and the conductors 6 and 7 are accommodated in the supporting structure defined by the whole of bases 22 and blocks 31, whereby excavations are not needed for burying the components. Line 1 may be inserted into the road paving 13 in a relatively simple manner, by casting the material of the road paving 13 itself on both sides of the line 1, both while making the road surface, and during a possible road maintenance.

Furthermore, the road lane on which the line 1 is installed may be used by any tired vehicle and not only by the electric vehicles authorized to pick up electricity, especially by leveling surface 11 with surface 12. By virtue of such a leveling, it is then possible to use captors 14a,14b of rolling type to pick up electricity from line 1, without needing to continuously lift and lower the captors 14a,14b with respect to the platform 15, with consequent advantages regarding the wear of the captors 14a,14b themselves.

Furthermore, line 1 allows to activate only the plates 10 placed under the vehicle 4: thereby the danger of electrocution for a pedestrian crossing the lane is practically eliminated. Further contrivances may be implemented, however, in unit 46 to reduce the risk of electrocutions (e.g. deactivating the plates 10 after a maximum predetermined time).

Having a separate base 22 and block 31 for each tile 21, instead of having an insulating structure made in one piece facilitates the coupling of the conductors 6 and 7 on the tiles 21 and allows to use continuous, relatively long conductors 6 and 7, i.e. to avoid the use of conductors split into separate portions (one for each plate 21) to be connected to one another. Thereby, losses of electric load which would derive from the connections of the various portions of the conductors 6 and 7 are avoided, indeed because the conductors 6 and 7 continuously extend over a series of tiles 21.

Finally, from the above, it is apparent that changes and variants may be made to tile 21, line 1 and vehicle 4, without therefore departing from the scope of protection of the present invention, as defined in the appended claims.

For example, the vehicle 4 could be of the hybrid type, i.e. could also have a thermal engine in addition to the electric motor. The command which switches the switches 47,48 could be remotely emitted, e.g. by means of radiofrequency signals; and/or base 22 and block 31 could be made in one piece with the conductors 6 and 7 consisting of a series of connectable portions, respectively embedded in the tiles 21, and/or could have different shape and dimensions from those shown by way of example.

Finally, two or more rows of tiles 21 could be provided instead of only one row, so as to define the whole road surface.

The invention claimed is:

1. A tile for forming a ground power supply line comprising:
   a supporting structure made of electrically insulating material;
   an external conductive plate, arranged on an upper surface of said supporting structure and fixed to said supporting structure;
   wherein said supporting structure has:
   a first channel for a first portion of conductor which, in use, is connected to a first polarity of an electric generator;
   a second channel for a second portion of conductor which, in use, is connected to a second polarity of said electric generator; said second channel being parallel and electrically isolated from said first channel;
   and an electric connection assembly, which is accommodated in said supporting structure and includes:
   an electric connector in contact with said external conductive plate along said upper surface,
   a pair of electric connectors arranged at said first and second channels, respectively, to come in contact with said first and second portions of conductor;
   a switching assembly including a first switch connected between said plate and said first portion and a second switch connected between said plate and said second conductor, said first and second switches being normally open; and
   a control and command circuit for selectively switching one of said first and said second switches to electrically connect said external conductive plate to one of said first and second portions of conductor in response to a signal deriving from an electric vehicle passing over said external conductive plate.

2. A tile according to claim 1, wherein said supporting structure comprises:
   a base which may be fixed to the ground by means of connection devices;
   an upper block defining said upper surface and accommodating said electric connection means; and
   a fixing member fixing said upper block to said base.

3. A tile according to claim 2, wherein said first and second channels are made between said base and said upper block.

4. A tile according to claim 1, wherein said supporting structure has an upper terminal area, which is uncovered and aligned with said upper surface, and wherein said external conductive plate overhangingly protrudes with respect to said supporting structure in a direction opposite to said upper terminal area, to be rested in use on the upper terminal area of an adjacent tile along said ground power supply line.

5. A tile according to claim 4, wherein said supporting structure comprises a ridge which protrudes upwards and separates said upper surface from said upper terminal area.

6. A tile according to claim 5, wherein said external conductive plate is arranged horizontally in contact against said ridge and has a longitudinal dimension such as to horizontally come in contact, on the opposite side, with the ridge of an adjacent tile along said line.

7. A tile according to claim 6, wherein said ridge has an undulated profile in plan, and in that said external conductive plate longitudinally ends with edges which have a profile complementary to that of said ridge.

8. A tile according to claim 1, further comprising a coupling element being coupled in a horizontally fixed position to other two tiles, which are adjacent along a longitudinal horizontal direction.

9. A ground power supply line comprising:
   a sequence of tiles aligned along a horizontal longitudinal direction and made according to claim 1, and
   two parallel conductors engaging first and second channels of said tiles, respectively, and connected to respective polarities of an electric generator.

10. A line according to claim 9, wherein the external conductive plates has an upper surface that is flush with a road surface.

11. A line according to claim 10, wherein sides of the supporting structure of said tiles are embedded in a road paving.

12. An electric traction vehicle correlated to an electric power supply line made according to claim 10, the vehicle comprising two electricity captors arranged at a sufficient distance to come in contact with external conductive plates of different tiles, wherein said electricity captors are rolling elements.

13. A tile for forming a ground power supply line comprising:
   a supporting structure made of electrically insulating material
   a first conductor having a first electrical polarity and a second conductor having a second electrical polarity;
   an external conductive plate, arranged on an upper surface of said supporting structure and fixed to said supporting structure;
   a switching assembly including a first switch connected between said plate and said first polarity of said electric generator and a second switch connected between said plate and said second polarity of said electric generator, said switches being normally open; and
   a control and command circuit for selectively switching one of said first and second switches to thereby connect said plate to one said first and second conductors in response to a signal deriving from an electric vehicle passing over said external conductive plate.

14. A tile according to claim 1 wherein said switching assembly and said control and command circuit cooperate to disconnect said external conductive plate from both said first and second portions of conductors and maintain said external plate electrically floating with respect to said first and second polarities when there is no electrical vehicle passing over said external conductive plate.

15. A system for providing power to a motor vehicle traveling on a road bed, the motor vehicle including a first electricity captor and a second electricity captor, said electricity captors being arranged longitudinally with each other with respect to a direction of movement of the motor vehicle; the system comprising:
   a row of tiles supported by the road bed, each the including
      a top plate having an electrically conductive top surface,
      a body made of an electrically insulated material, said body supporting said top plate; and first and second switches;
   a first electrical conductor extending along said row of tiles;
   a second electrical conductor extending along said row of tiles; and
   an electrical generator generating a voltage and having a first terminal of a first polarity and connected to said first electrical conductor and a second terminal having a second polarity and connected to said second electrical conductor,
   said tiles cooperating to activate said switches to selectively connect the top plate of a first tile to said first connector and simultaneously to connect the top plate of a second tile adjacent to said first tile to the second electrical connector when said motor vehicle is disposed above said first and said second tiles with said first electricity captor being in contact with the top plate of the first tile and the second electricity captor being in contact with the top plate of the second tile to thereby apply said voltage between said first and second electrical captors,
   wherein the bad of each tile includes a first and a second channel, said tiles cooperating to hold said first and second electrical conductors in said first and second channels, respectively.

16. The system of claim 15, further including a sensor for sensing one of said first and second electricity captors.

17. The system of claim 16 wherein said electrical circuits cooperate to selectively connect the top plate of each tile to the first electrical conductor when sensing the first electricity captor and to connect the top plate of each tile to the second electrical conductor when sensing the second electricity captor.

18. A system for providing power to a motor vehicle traveling on a road bed, the motor vehicle including a first electricity captor and a second electricity captor, said electricity captors being arranged longitudinally with each other with respect to a direction of movement of the motor vehicle, the system comprising:
   a row of tiles supported by the road bed, each tile including
      a top plate having an electrically conductive top surface,
      a body made of an electrically insulated material, said body supporting said top plate; and first and second switches;
   a first electrical conductor extending along said row of tiles;
   a second electrical conductor extending along said row of tiles;
   an electrical generator generating a voltage and having a first terminal of a first polarity and connected to said first electrical conductor and a second terminal having a second polarity and connected to said second electrical conductor,
   said tiles cooperating to activate said switches to selectively connect the top plate of a first tile to said first connector and simultaneously to connect the top plate of a second tile adjacent to said first tile to the second electrical connector when said motor vehicle is disposed above said first and said second tiles with said first electricity captor being in contact with the top plate of the first tile and the second electricity captor being in contact with the top plate of the second tile to thereby apply said voltage between said first and second electrical captors;
   a sensor for sensing one of said first and second electricity captors;
   wherein said electrical circuits cooperate to selectively connect the top plate of each tile to the first electrical conductor when sensing the first electricity captor and to connect the top plate of each tile to the second electrical conductor when sensing the second electricity captor.

* * * * *